United States Patent
Ahmed et al.

(10) Patent No.: US 9,996,772 B2
(45) Date of Patent: Jun. 12, 2018

(54) DETECTION OF OBJECTS IN IMAGES USING REGION-BASED CONVOLUTIONAL NEURAL NETWORKS

(71) Applicant: International Business Machines Corporation, Armonk, NY (US)

(72) Inventors: Mohamed N. Ahmed, Leesburg, VA (US); Andeep S. Toor, Chantilly, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 15/140,597

(22) Filed: Apr. 28, 2016

(65) Prior Publication Data

US 2017/0316285 A1 Nov. 2, 2017

(51) Int. Cl.
- G06K 9/62 (2006.01)
- G06K 9/66 (2006.01)
- G06K 9/52 (2006.01)
- G06T 7/00 (2017.01)
- G06K 9/46 (2006.01)

(52) U.S. Cl.
CPC ............... G06K 9/66 (2013.01); G06K 9/52 (2013.01); G06K 9/6215 (2013.01); G06K 9/6256 (2013.01); G06K 9/6267 (2013.01); G06T 7/0042 (2013.01); G06K 2009/4666 (2013.01)

(58) Field of Classification Search
CPC ...... G06K 9/66; G06K 9/6215; G06K 9/6256; G06K 9/52; G06K 9/6267; G06K 2009/4666; G06T 7/73

USPC ............ 382/156, 157, 158, 159; 348/207.99, 348/222.1, 231.99, 231.3, 231.4; 455/73, 455/403, 412.1, 412.2, 550.1
See application file for complete search history.

(56) References Cited

U.S. PATENT DOCUMENTS

| | | | | |
|---|---|---|---|---|
| 5,754,676 A | * | 5/1998 | Komiya | G06K 9/6217 382/132 |
| 6,018,562 A | * | 1/2000 | Willson | G01N 23/087 378/57 |
| 7,319,321 B2 | * | 1/2008 | Murray | G01V 3/081 324/243 |
| 7,848,566 B2 | * | 12/2010 | Schneiderman | G06K 9/00241 382/159 |

(Continued)

OTHER PUBLICATIONS

UCL; Departmental Seminar: Vision & Imaging Science group: Lewis Griffin and Nicolas Jaccard, Mar. 16, 2016.

(Continued)

*Primary Examiner* — Sheela C Chawan
(74) *Attorney, Agent, or Firm* — Garg Law Firm, PLLC; Rakesh Garg; Christopher K. McLane

(57) ABSTRACT

A transformed image is received. The transformed image includes an other-than-visible light image that has been captured using a transformation device. A region of the transformed image is isolated, the region being less than an entirety of the transformed image. By applying to the region a convolutional Neural Network (CNN) which executes using a processor and a memory, and by processing only the region of the transformed image, an object of interest is detected in the region. Upon detecting, an indication is produced to indicate the presence of the object of interest in the region.

19 Claims, 10 Drawing Sheets

(56) References Cited

U.S. PATENT DOCUMENTS

| | | | |
|---|---|---|---|
| 8,903,128 B2* | 12/2014 | Shet | G06K 9/6296 |
| | | | 382/103 |
| 9,557,436 B2* | 1/2017 | Chen | G01V 5/005 |
| 9,668,699 B2* | 6/2017 | Georgescu | A61B 5/7267 |

OTHER PUBLICATIONS

Roomi et al; Detection of Concealed Weapons in X-Ray Images Using Fuzzy K-NN, International Journal of Computer Science, Engineering and Information Technology (IJCSEIT), vol. 2, No. 2, Apr. 2012.

Girshick et al; Region-based Convolutional Networks for Accurate Object Detection and Segmentation, 2012.

Despotovic et al; Noise-robust method for image segmentation, 2009.

Mercury Computer Systems, Automated Threat Detection for Baggage Screening, 2009.

Wells et al; A Review of X-ray Explosives Detection Techniques for Checked Baggage, 2011.

* cited by examiner

DETECTION OF OBJECTS IN IMAGES USING REGION-BASED CONVOLUTIONAL NEURAL NETWORKS

TECHNICAL FIELD

The present invention relates generally to a method, system, and computer program product for detecting objects of interest in images. More particularly, the present invention relates to a method, system, and computer program product for detection of objects in regions of images using convolutional neural networks.

BACKGROUND

Hereinafter, a digital image is interchangeably referred to as simply "images" or "image" unless expressly disambiguated where used.

An image is a digital representation or facsimile of a physical object or a collection of physical objects. Technology presently exists to detect or recognize certain objects that are present in a given image. For example, a digital camera can recognize that objects, such as human faces or human eyes, are present in an image created by the camera lens on the sensor of the camera. Photo editing software can recognize that objects, such as straight lines, are present in an image being edited.

Generally, the present technology for object detection in images relies upon identifying those features of those objects for which such technology has been programmed. Stated another way, an existing image processing engine will only recognize certain objects by identifying certain features of those objects, where the engine is pre-programmed to identify the features described in a file or repository of features that is associated with the engine. There is a specific syntax in which the features are described in such a file, the engine reads the syntactic definition of a feature from the file, the engine compares image pixels with the defined feature, and the engine finds an acceptable match between a defined feature from the file and certain pixel arrangements in the given image.

SUMMARY

The illustrative embodiments provide a method, system, and computer program product. An embodiment includes a method that receives a transformed image, the transformed image comprising an other-than-visible light image that has been captured using a transformation device. The embodiment isolates a region of the transformed image, the region being less than an entirety of the transformed image. The embodiment detects, by applying to the region a convolutional Neural Network (CNN) which executes using a processor and a memory, and by processing only the region of the transformed image, an object of interest in the region. The embodiment outputs, responsive to the detecting, an indication of a presence of the object of interest in the region.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
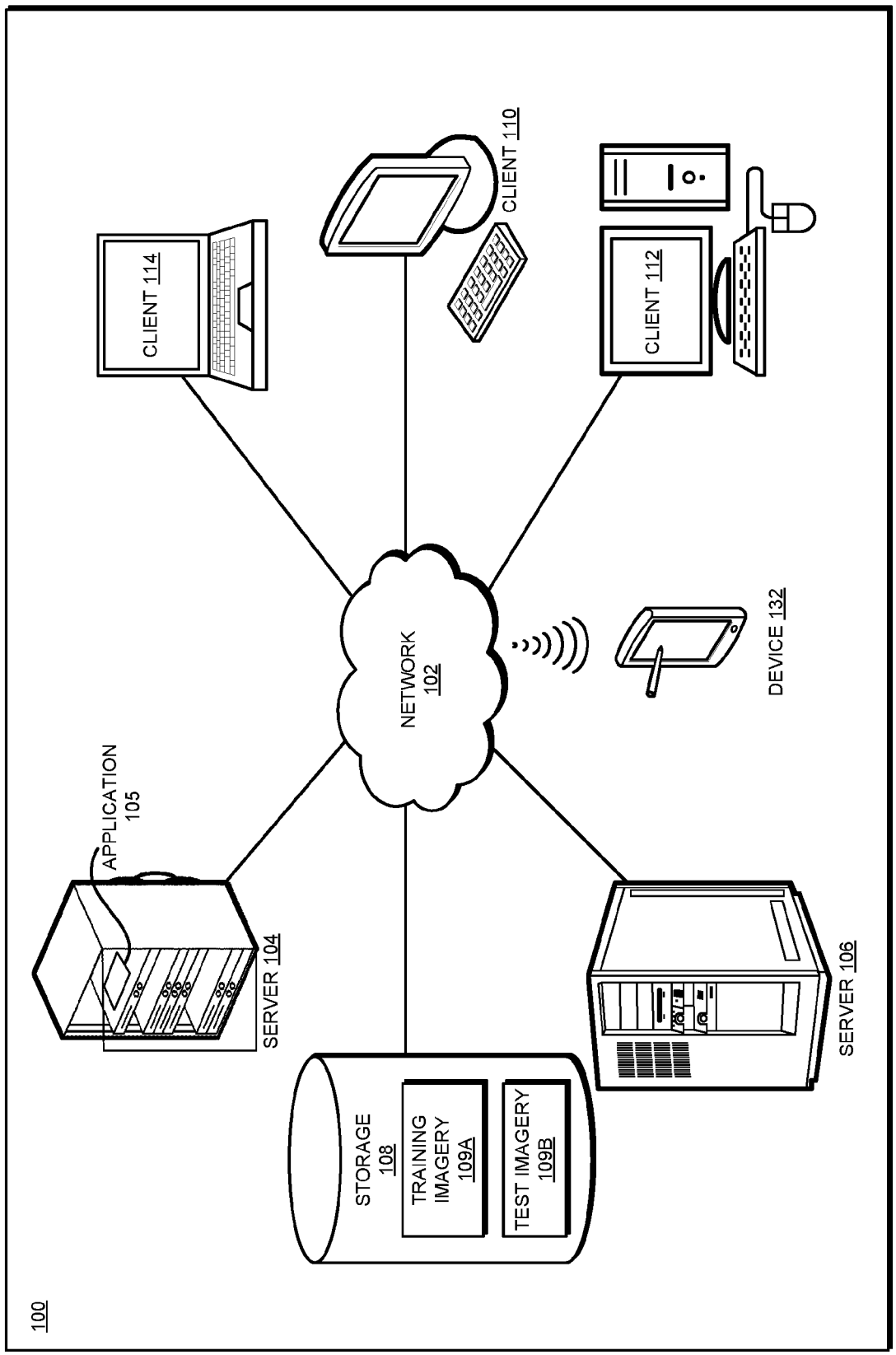
FIG. 1 depicts a block diagram of a network of data processing systems in which illustrative embodiments may be implemented.

The illustrative embodiments recognize that identifying objects in images based on known features of those objects is not always successful in recognizing the object in a given image. For example, users are all too familiar with the presence of a face in a given image not being recognized by the presently available tools.

Often, the presently available tools miss an object detection because the features of the object in the image are not within the parameters of the feature defined in the tool's feature repository. For example, a presently available tool may be programmed to detect a human face when the face is substantially turned towards the imaging device. Such a tool will likely not detect the presence of a human face if the face were substantially turned away from the imaging device, or when only a silhouette of the face is present in the image.

The illustrative embodiments recognize that the feature definition-based object detection in digital images is severely limited when previously unknown or undefined features become associated with an object. For example, suppose that a pipe object was defined according to an existing methodology by the features—circular shaped ends which can appear elliptical, and a pair of parallel straight line lengths which can appear converging on one side. Such a feature definition used by a presently available methodology would not identify a curved piece of a tapered pipe as a pipe object. A human, on the other hand, would be able to recognize the curved piece of tapered pipe as a pipe even if the human has never seen such an object before.

This unusual example shows some of the limitations of the feature-based object detection in presently available technology. From this disclosure, those of ordinary skill in the art will be able to recognize similar limitations and other limitations of the feature-based object detection in presently available technology.

The illustrative embodiments further recognize that an object can appear transformed in an image for a variety of reasons. For example, when a box is imaged using a visible light imaging device, the representation of the box object in the image appears to have the characteristics of the box's exterior features, such as six flat surfaces, twelve straight edges, and eight vertices, having certain color, texture, curvature, and other exterior physical aspects of the box.

However, as another example, when the same box is imaged using infrared imaging device, the representation of the box object in the image appears to have the thermal characteristics of the box's exterior and/or interior features depending on the temperature of the box and its contents. The image of the object is said to have transformed into a thermal image. For example, the surfaces, edges, and vertices may not even appear in the transformed image if they are at the same temperature as their surroundings. Hot bread inside the box will cause the box to appear as the fuzzy or diffused thermal outline of a lump due to convective heat loss from the bread inside the box.

The same box object in the transformed image appears very different from its representation in the visible light image. The features defined for a box object, e.g., the six flat surfaces, twelve straight edges, and eight vertices, having certain color, texture, curvature, and other exterior physical aspects of the box, will be completely useless in detecting the box in an infrared image.

As another example, when the same box is imaged using x-ray imaging device, the representation of the box object in the image appears to have the x-ray blocking characteristics of the box's exterior and/or interior features depending on the material used in the construction of the box and the materials used in the construction of the contents of the box. The image of the object is said to have transformed into an x-ray image. For example, the surfaces, edges, and vertices may not even appear in the transformed image if they are constructed from paper, plastic or some other material that is transparent to x-ray of a configured strength and frequency. The contents inside the box will cause the box to appear as the overlapping shapes of the various objects present in the contents based on how the objects are arranged to form the contents inside the box.

The same box object in the transformed x-ray image now appears very different from its representation in the visible light image or infrared light. The visible features defined for a box object, e.g., the six flat surfaces, twelve straight edges, and eight vertices, having certain color, texture, curvature, and other exterior physical aspects of the box, or even the thermal features of the box will be completely useless in detecting the box in an x-ray image.

Producing an affirmative detection of an object in a given image is called classification. Thus, the illustrative embodiments recognize that classifying a portion of an image as an object becomes especially tricky when the object can appear transformed in a given image, by including features that are not previously programmed for, excluding features that are previously programmed for, or some combination thereof. The problem is further exacerbated when the object appears in combination with other objects, such as overlapped in a packed suitcase being x-rayed for security, and when those other objects also present features not previously associated with those objects. Thus, the illustrative embodiments recognize that it becomes an extremely difficult problem to automatically, systematically, and accurately detect an object of interest when the objects appear transformed in a given set of images.

Image processing is a computation-intensive task. A thorough analysis of a given image can easily take several minutes on a commercially available desktop computer. Therefore, the illustrative embodiments also recognize that detecting objects of interest in a time-efficient manner—such as in real-time while x-ray scanning passenger baggage at an airport—is even more difficult using the presently available methods.

The illustrative embodiments used to describe the invention generally address and solve the above-described problems and other problems related to identifying objects of interest in transformed images.

An embodiment can be implemented as a software application. The application implementing an embodiment can be configured as a modification of an existing image recognition system, as a separate application that operates in conjunction with an existing image recognition engine or system, a standalone application, or some combination thereof.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

In machine learning, a convolutional neural network (CNN) is a type of artificial neural network in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images.

A region-based convolutional neural network (RCNN) is a CNN that has been trained to identify regions of digital image data where an object of interest might be present with a certain degree of certainty (or a certain level of confidence)

One of the drawbacks of generic CNNs is that in order to recognize multiple objects in an image with corresponding bounding boxes (regions of the image), a sliding window technique must be used at varying scales. The sliding window slides over the image covering overlapping regions and the data in the overlapping regions is then analyzed. This adds a large computational cost to running the algorithm. RCNNs extend a CNN and mitigate the computational cost by using a separate algorithm that filters the image down to the "most likely" areas to contain an object. These object proposal algorithms use a set of heuristics (e.g., superpixels, color, texture, and others) to determine an image window's likelihood of containing an object of interest. This methodology can significantly reduce the number of object-containing regions that have to be processed by the RCNN.

An embodiment trains an RCNN for detecting one or more objects of interest in a transformed image that has been transformed as a result of some imaging condition or image preprocessing. For example, an embodiment can be adapted for detecting one or more objects of interest in a transformed x-ray image. As another example, an embodiment can be adapted for detecting one or more objects of interest in a transformed infrared image. Generally, an embodiment can also be adapted for detecting one or more objects of interest in a transformed image produced by electromagnetic radiation in other wavelengths, radar, sonar, or by other distortion of other types of waves incident upon objects of interest.

To train the RCNN, the embodiment selects an object of interest for which the RCNN has to be trained. Using a repository of training imagery, the embodiment selects training images that include the object (positive imagery) and images that exclude the object (negative imagery). The positive and negative images are used to train the RCNN to recognize the object in a variety of transformations without relying upon a preset definition of features to detect the object.

A set of test imagery is used to test the trained RCNN's effectiveness in object detection. A test image may not contain any representation of the object that has been used in the training. The RCNN is considered trained when the RCNN is able to detect the object in a test image with at least a threshold amount of confidence.

Another embodiment identifies a region of a given image in which an object of interest is likely to be present with at least a threshold amount of likelihood. To identify such a region in an image, the embodiment uses a robust fuzzy C-means algorithm with spatial constraints segmentation. In an implementation of this algorithm, the embodiment causes the classification of a pixel to be affected by the labels in the immediate neighborhood of the pixel. The neighborhood effect acts as a regularizer and biases the solution toward piecewise-homogeneous labeling.

The algorithm of an embodiment can be adapted such that classification using this method classifies a pixel, or a set of pixels. The algorithm of an embodiment can be adapted such that the neighborhood is defined by a certain pre-determined pixel distance of neighboring pixels. In other words, a pixel is regarded as being in the neighborhood of another pixel if the pixel is located within the specified pixel distance of the other pixel.

The fuzzy C-means algorithm (FCM) has been utilized in a wide variety of image processing applications. Its advantages include straightforward implementation, fairly robust behavior, applicability to multi-channel data, and the ability to model uncertainty within the data. The standard FCM objective function for partitioning into clusters is given by $$J = \sum_{i=1}^{c} \sum_{k=1}^{N} \mu_{ik}^p \|x_k - v_i\|^2 \quad (1)$$

Where $\{v_i\}_{i=1}^{c}$ are the prototypes of the clusters and the array $[u_{ik}]=U$ represents a partition matrix, namely, $$U\left\{u_{ik} \in [0,1] \,\middle|\, \sum_{i=1}^{c} u_{ik} = 1 \forall k \text{ and } 0 < \sum_{k=1}^{N} u_{ik} < N \forall i \right\} \quad (2)$$

The parameter p is a weighting exponent on each fuzzy membership and determines the amount of fuzziness of the resulting classification. The FCM objective function is minimized when high membership values are assigned to pixels whose intensities are close to the centroid of its particular class, and low membership values are assigned when the pixel data is far from the centroid.

The algorithm of an embodiment is formulated by modifying the objective function of the standard FCM algorithm. This new formulation allows the labeling of a pixel to be influenced by the labels in its immediate neighborhood. Taking into account the neighborhood effect acts as a regularizer and biases the solution towards piecewise-homogeneous labeling. Such regularization is useful in segmenting scans corrupted by a variety of noise sources.

An embodiment modifies equation (1) by introducing a term that allows the labeling of a pixel to be influenced by the labels in its immediate neighborhood. The neighborhood effect acts as a regularizer and biases the solution towards piecewise-homogeneous labeling. Such regularization is useful in segmenting scans corrupted by salt and pepper noise. The modified objective function of the embodiment is given by $$J_m = \sum_{i=1}^{c} \sum_{k=1}^{N} \mu_{ik}^p \|x_k - v_i\|^2 + \frac{\alpha}{N_R} \sum_{i=1}^{c} \sum_{k=1}^{N} \mu_{ik}^p \left( \sum_{x_r \in N_k} \|x_r - v_i\|^2 \right) \quad (3)$$

Where $N_k$ stands for the set of neighbors that exist in a window around $x_k$ and $N_R$ is the cardinality of $N_k$. The effect of the neighbors term is controlled by the parameter $\alpha$. The relative importance of the regularizing term is inversely proportional to the signal to noise ratio (SNR) of the image signal. Lower SNR would require a higher value of the parameter $\alpha$.

Formally, the optimization problem comes in the form $$\min_{U,V} J_m \text{ subject to } U \in \mathbb{U} \quad (4)$$

The new penalty term is minimized when the membership value for a particular class is large and the membership values for the other classes at neighboring pixels is small (and vice versa). In other words, it constrains the membership value of a class to be negatively correlated with the membership values of the other classes at neighboring pixels.

Membership Evaluation

The zero-gradient condition for the membership estimator can be rewritten as, $$u_{ik}^* = \frac{1}{\sum_{j=1}^{c} \left( \frac{D_{ik} + \frac{\alpha}{N_R}\gamma_i}{D_{jk} + \frac{\alpha}{N_R}\gamma_j} \right)^{\frac{1}{p-1}}} \quad (5)$$

Where $D_{ik} = \|x_k - v_i\|^2$ and $$\gamma_i = \left( \sum_{x_r \in N_k} \|x_r - v_i\|^2 \right).$$

Cluster Prototype Updating $$v_i^* = \frac{\sum_{k=1}^{N} \mu_{ik}^p \left( x_k + \frac{\alpha}{N_R} \sum_{x_r \in N_k} x_r \right)}{(1+\alpha) \sum_{k=1}^{N} \mu_{ik}^p} \quad (6)$$

Thus, given an image, an embodiment isolates one or more regions of the image which have at least a threshold amount of likelihood of including one or more objects of interest. The embodiment then identifies the one or more objects of interest in these regions with at least a threshold degree of confidence.

For the object detection to be successful over a large variety of transformed images in which an object can take numerous transformed forms, the size of the training data is important. Machine learning (ML) technology requires that images with and without the object of interest be processed, accompanied by ground truth data defining the actual image content, to build the experience base of the RCNN. Ground truth is an actual transformed image known to contain some representation of the object of interest.

Through this process of training, the RCNN learns to identify, generalize, and discriminate objects in images. For example, the weights associated with the nodes of the neural network are adjusted in such a manner that the neural network will output a positive detection outcome when an input transformation image containing some representation of the object of interest is provided, without using or referencing a pre-defined feature corresponding to the object from a file or a repository.

An embodiment configures a Generative Adversarial Network (GAN), which learns to produce transformed images according to a specified transformation without using the apparatus that is generally required to produced that type of transformed images—e.g., produce x-ray images from visible light images without using an x-ray imaging apparatus. A GAN according to an embodiment includes two components—a generator and a discriminator.

The generator takes a set of single-object non-transformed images as input and learns to convert this image into a transformed image of the object. For example, given a visible light image of a shoe, the generator produces something that could pass as an x-ray image of the shoe without actually x-raying the shoe.

The discriminator learns to distinguish between generated transformed image and an actual transformed image for that type of object. For example, given a visible light image of a shoe, the discriminator can distinguish between generator-generated transformed image of the shoe that could pass as an x-ray image of the shoe, and an actual x-ray of the shoe produced by actually x-raying the shoe.

The generator and the discriminator are configured such that the generator produces a generated transformed image and provides the generated transformed image as input to the discriminator. The discriminator produces an outcome (error value) indicating whether the generated transformed image of the object is indistinguishable to the discriminator from the actual transformed image of the object.

An objective of the training according to an embodiment is to minimize the error value of the discriminator while maximizing the difference between the generated transformed image and the ground truth in the generator. In other words, we want to be able to generate generated transformed images of an object that vary vastly from the ground truth while being able to confuse the discriminator into believing that the generated transformed image is the ground truth. A generated transformed image that succeeds in this training exercise is added to the training imagery, which is used to train the RCNN as described herein.

Different instances of an embodiment may be executing at different locations or times, and may identify different objects of interest. For example, one instance of an embodiment may execute at an airport in Dallas and identify an object of interest in a passenger's baggage. Another instance of the embodiment may execute at an airport in Los Angeles and identify another object of interest in a passenger's baggage. The two instances send the information about their respective objects to another embodiment, e.g., an embodiment executing at a Transportation Security Administration (TSA) server in Washington D.C. The two instances also collect additional data, e.g., itinerary and personal profiles of the passengers with whom the objects of interest are associated. The embodiments send the additional data to the embodiment in the TSA server along with the information about the detected objects.

The embodiment in the TSA server determines whether the two objects of interest are combinable to produce another object of interest, and whether—given the itineraries and profiles—a likelihood exists of creating such a combination at some future location and time. The embodiment produces additional notification from an affirmative determination when a likelihood exists of creating such a combination at some future location and time.

A method of an embodiment described herein, when implemented to execute on a device or data processing system, comprises substantial advancement of the functionality of that device or data processing system in detecting objects of interest in identified regions of transformed images. For example, presently available methods for object detection in images relies primarily on pre-identified features of the object, which are programmed in a repository, and used by an object detection engine for matching with actual features identified in a given image. An embodiment provides a method for using a modified FCM algorithm to identify a region of a given image where an object of interest is likely to be present. An embodiment further identifies the object in that region with a certain degree of confidence. To perform such an identification, the embodiment uses a trained RCNN. An embodiment trains the RCNN by generating transformed images of objects of interest and using the generated transformed images as training imagery. Objects of interest identified at different locations can then be projected as combinable at a future time and location. An embodiment further determines whether such a combination itself would be an object of interest. This manner of detection of objects in regions of images using convolutional neural networks is unavailable in the presently available methods. Thus, a substantial advancement of such devices or data processing systems by executing a method of an embodiment is in efficient, non-feature-based detection of objects in regions of digital images, and projecting their combinability into another object of interest.

The illustrative embodiments are described with respect to certain types of objects, images, transformations, regions, algorithms, equations, neural network configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
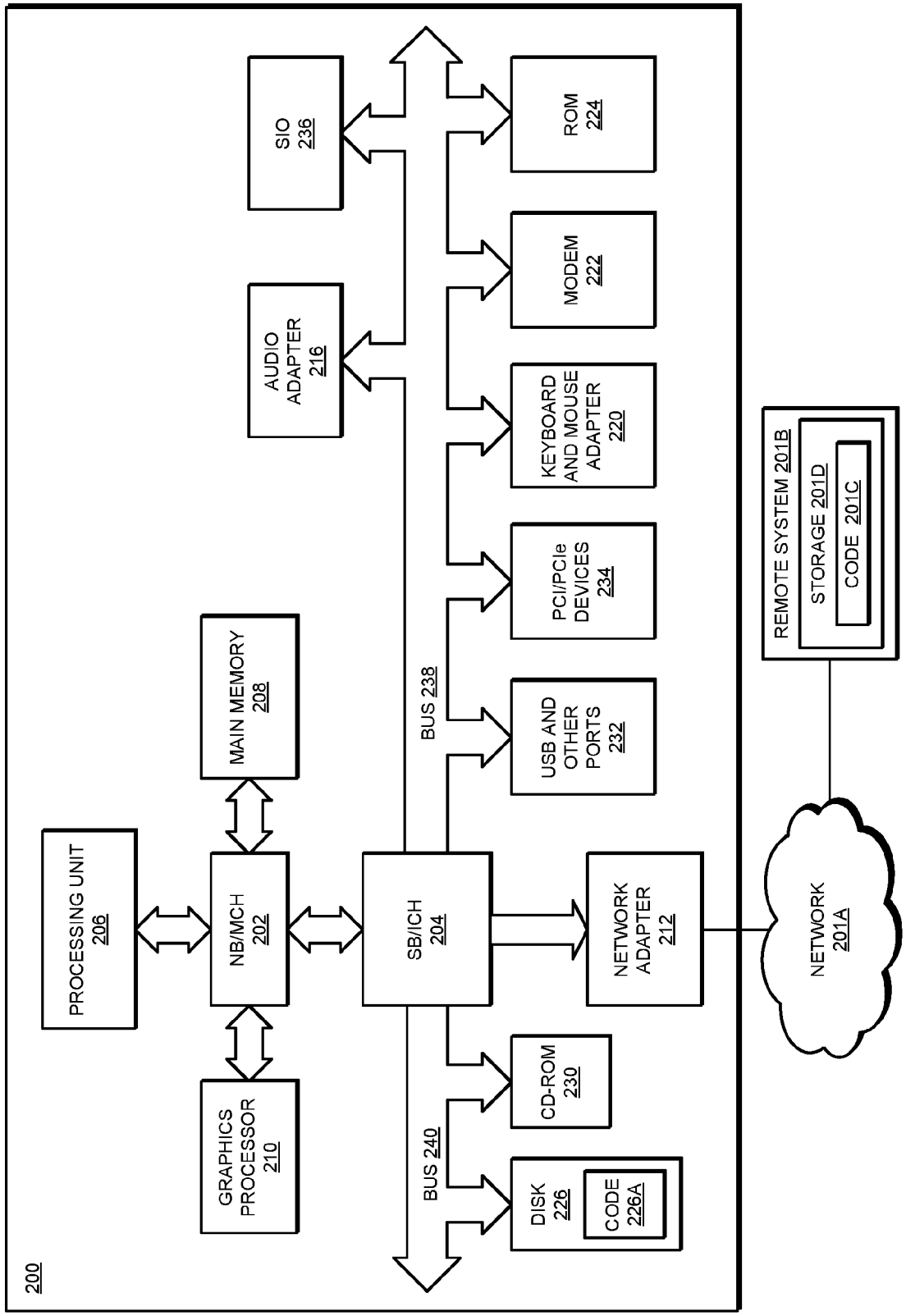
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 generates all or part of training imagery 109A, which includes transformed images of a set of objects of interest. Application 105 uses training imagery 109A of the set of objects of interest and test imagery 109B—which includes ground truth images of the set of objects of interest—to train an RCNN for object detection. Another instance of application 105 (not shown) may execute in another location, e.g., in server 107, and test combinations of objects detected by other instances, such as by application 105, in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may Include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
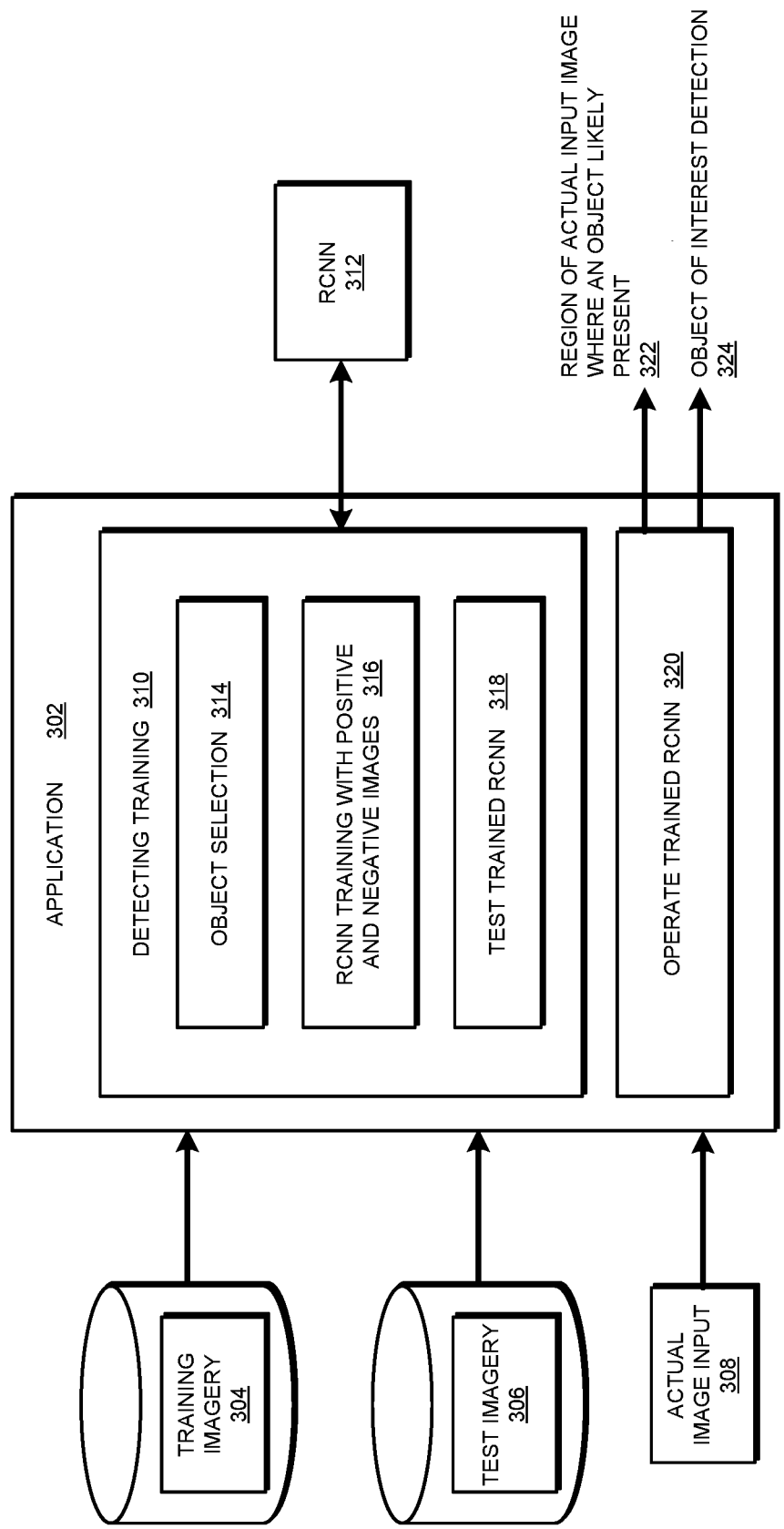
FIG. 3 depicts a block diagram of an example configuration for detection of objects in regions of images using convolutional neural networks in accordance with an illustrative embodiment.

With reference to FIG. 3, this figure depicts a block diagram of an example configuration for detection of objects in regions of images using convolutional neural networks in accordance with an illustrative embodiment. Application 302 is an example of application 105 in FIG. 1. Training imagery 304 is an example of training imagery 109A in FIG. 1. Test imagery 306 is an example of test imagery 109B in FIG. 1. Actual image input 308 is an actual transformed image in which an object of interest has to be detected.

Application 302 operates in a training mode and an operational or detection mode. In the training mode, detection training component 310 trains RCNN 312 for object detection in transformed images. Component 314 selects an object for which RCNN 312 has to be trained. In one embodiment, component 314 selects the object by selecting an identifier associated with the object. The transformed images in training imagery 304 are tagged with such identifiers, allowing component 314 to identify the training images that pertain to the selected object. The transformed images in test imagery 306 are similarly tagged and selected. Component 314 selects some positive training images of the object, to wit, where the training image is tagged with the object identifier, and some negative training images of the object, to wit, where the training image is not tagged with the object identifier.

Test imagery 306 is also tagged with object identifiers. Component 314 selects positive test images of the object, to wit, where the test image is tagged with the object identifier, and some negative test images of the object, to wit, where the test image is not tagged with the object identifier. Component 318 tests trained RCNN 312 by using positive and negative test images from test imagery 306 as described herein.

In the operational or detection mode, component 320 operates trained RCNN 312 to detect an object of interest for which RCNN 312 has been trained. For example, when actual image input 308 is provided, component 320 uses trained RCNN 312 or determine whether an object of interest from the set of objects, on which RCNN 312 is trained, is present with at least a threshold degree of confidence in actual image input 308. Specifically, component 320 produces two outputs—region 322 and object 324. Region 322 is a region in actual image input 308—i.e., a portion of image 308 that is less than the entirety of image 308—where some object of interest from the set of objects is likely to be present with at least a threshold likelihood. Object 324 is an object of interest that is present with at least a threshold degree of confidence in region 322 of actual image input 308.

Figure 4:
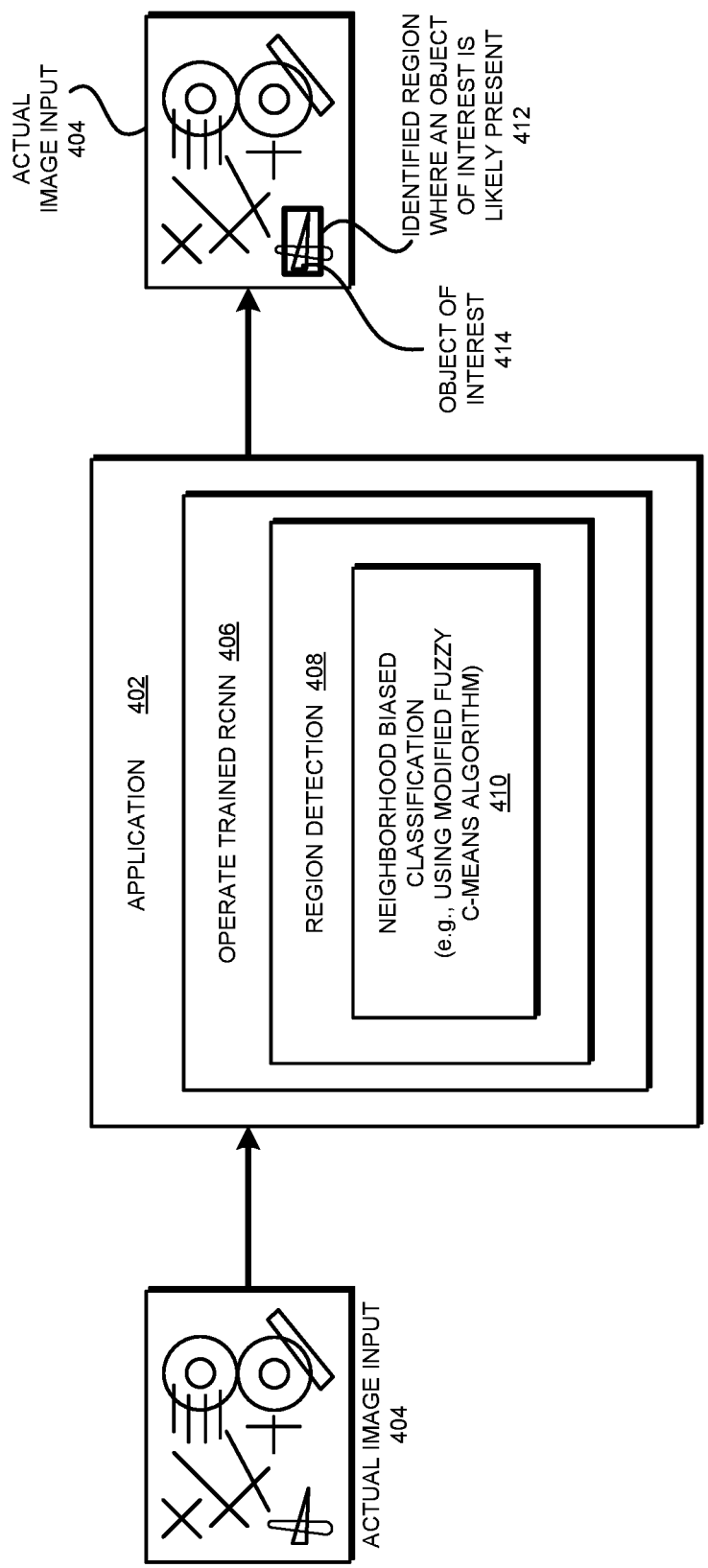
FIG. 4 depicts a block diagram of an example configuration for region-based detection of objects of interest in a digital image in accordance with an illustrative embodiment.

With reference to FIG. 4, this figure depicts a block diagram of an example configuration for region-based detection of objects of interest in a digital image in accordance with an illustrative embodiment. Application 402 is an example of application 302 in FIG. 3, and component 406 is an example of component 320 in FIG. 3. Actual image input 404 is an example of actual image input 308 in FIG. 3.

Component 406 includes subcomponent 408, which performs region detection in input 404. Specifically, subcomponent 408 implements a neighborhood-biased classification algorithm, such as Modified Fuzzy C-Means algorithm 410, as described herein, to identify region 412 in actual image input 404. Region 412 includes object of interest 414, which could be a knife blade as in the non-limiting depicted example. Advantageously, the output of subcomponent 408—region 412—significantly reduces the image data from input 404 which component 406 has to process using trained RCNN 312 of FIG. 3 for identifying object 414. The reduced image data of region 412 correspondingly reduces the time it takes an embodiment to identify object 414 in input 404, by analyzing the data only in region 412 instead of the entirety of input 404.

A single example of region 412 and a single example of object 414 are not intended to be limiting. From this disclosure, those of ordinary skill in the art will be able to identify any number of regions and any number of objects of interest in a similar manner, and the same are contemplated within the scope of the illustrative embodiments.

Figure 5:
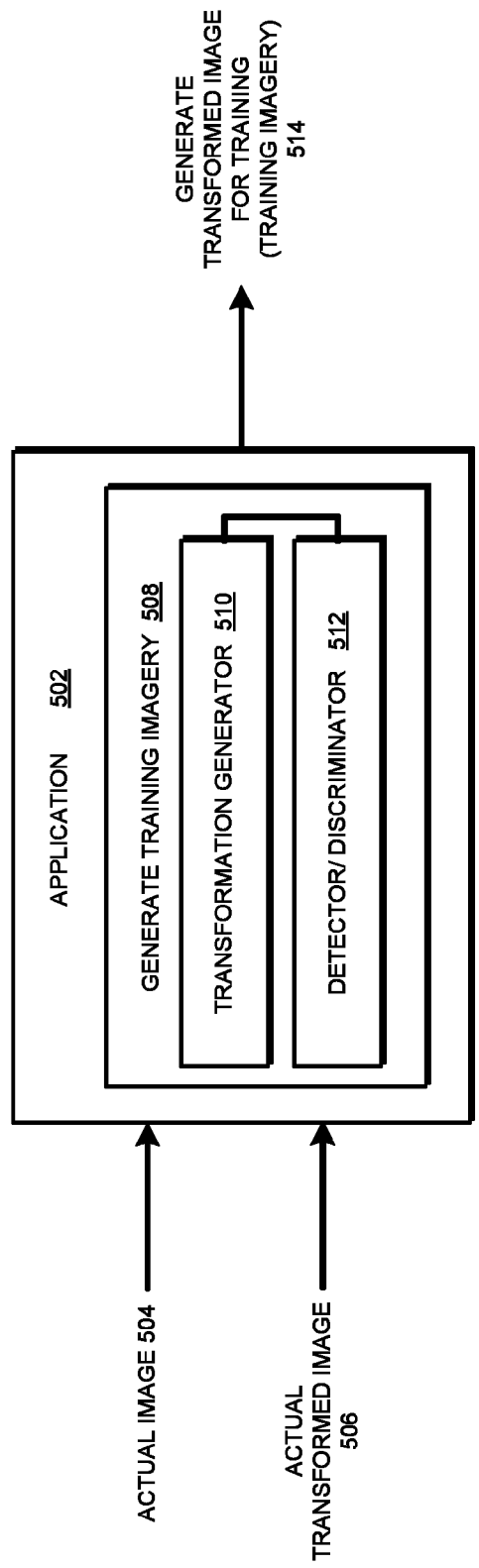
FIG. 5 depicts a block diagram of a configuration to generate transformed images for training in accordance with an illustrative embodiment.

With reference to FIG. 5, this figure depicts a block diagram of a configuration to generate transformed images for training in accordance with an illustrative embodiment. Application 502 is an example of application 402 with additional functionality described with respect to FIG. 5.

Actual image 504 is an image captured of an object of interest using imaging equipment, e.g. a visible light camera. Actual transformed image 506 is a transformed image captured of the object of interest using suitable transformation equipment, e.g., an x-ray machine.

Component 508 generates transformed images for training as described herein. Specifically, generator component 510 produces a generated transformed image of the object with the expectation that discriminator component 512 will not be able to reliably indicate that the generated transformed image is not that of the object. Note that the generated transformed image output of generator 510 may be different from actual transformed image 506. Generator 510 produces numerous varied generated transformed images of the object and provides them as input to discriminator 512.

Discriminator accepts as input a generated transformed image from generator 510 and determines whether the generated transformed image is representative of the object in actual transformed image 506. An error value at or above a threshold in discriminator 512 determines that the discriminator does not indicate that generated transformed image is of the object. An error value below the threshold in discriminator 512 determines that the discriminator has decided that generated transformed image is of the object. Application 502 outputs (514) all generated transformed images having error values below the threshold, to be added to training imagery 304 in FIG. 3.

Figure 6:
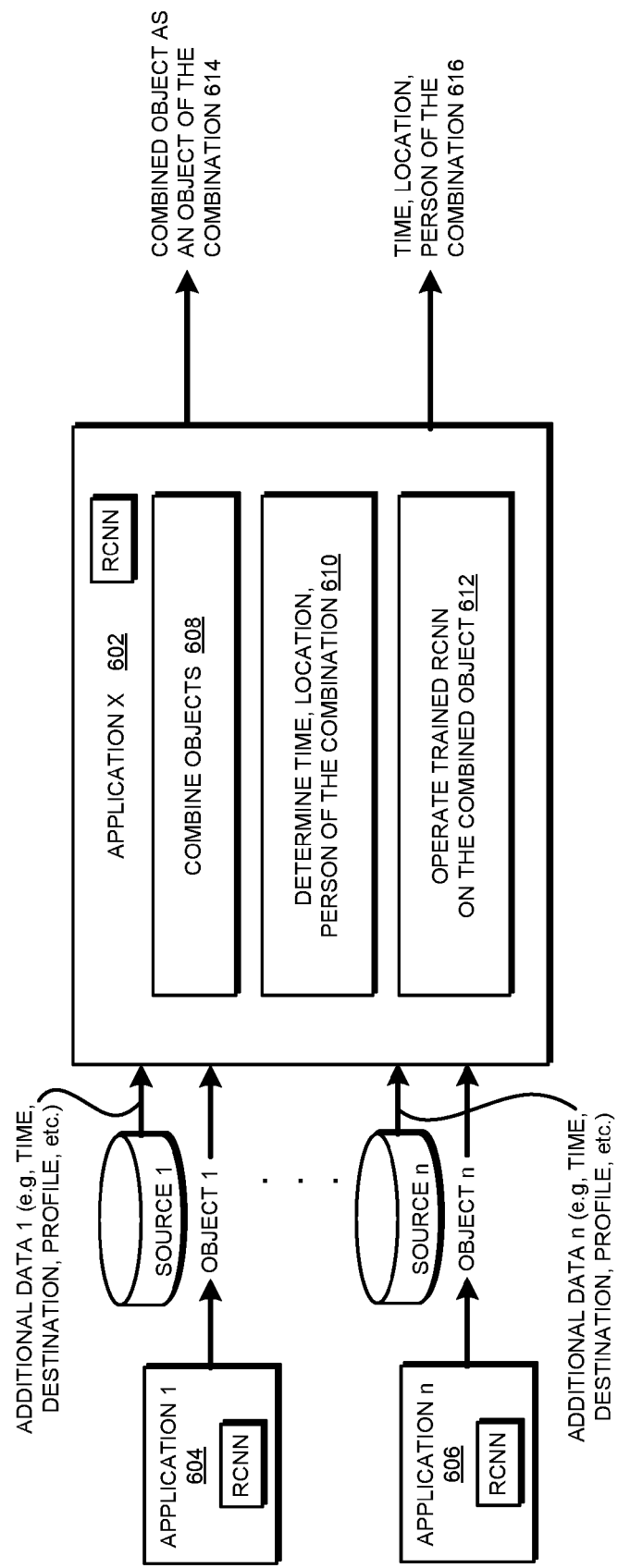
FIG. 6 depicts a block diagram of a configuration for identifying a combination object of interest in accordance with an illustrative embodiment.

With reference to FIG. 6, this figure depicts a block diagram of a configuration for identifying a combination object of interest in accordance with an illustrative embodiment. Application 602 (labeled "Application x") is an example of application 402 in FIG. 4 or 502 in FIG. 5, with additional capabilities described with respect to FIG. 6. Application 602 operates in conjunction with an RCNN as described herein.

Application 604 (labeled "Application 1") is an example of application 402 in FIG. 4 or 502 in FIG. 5 and operates in conjunction with or includes a trained RCNN as described herein. Application 604 executes separately from application 602 and 606, such as in physical locations different from one another. Similarly, application 606 (labeled "Application n") is another example of application 402 in FIG. 4 or 502 in FIG. 5 and operates in conjunction with or includes a trained RCNN as described herein. Application 606 executes separately from application 602 and 604, such as in physical locations different from one another. As a non-limiting example, assume that application 1 executes in Dallas, any number of applications implementing an embodiment execute similarly in various locations, application n executes in Los Angeles, and application x executes in Washington D.C.

Suppose that application 1 detects object 1, which is an object of interest. Source 1 at the location of application 1 is a system that is processing an identification information, an itinerary information, or some combination of these and/or other identifying information related to a person associated with object 1.

Application 1 provides to application x information about object 1. Source 1 provides to application x additional data 1. Additional data 1 includes a time of detection, one or more destinations where the person associated with object 1 is expected to travel (and by association where object 1 is expected to travel), and one or more identifying information about the person.

Operating in a similar manner, suppose that application n detects object s, which is a different object of interest. Source n at the location of application n is a system that is processing an identification information, an itinerary information, or some combination of these and/or other identifying information related to a person associated with object n.

Application n provides to application x information about object n. Source n provides to application x additional data n. Additional data n includes a time of detection, one or more destinations where the person associated with object n is expected to travel (and by association where object n is expected to travel), and one or more identifying information about the person.

In this manner, application x receives information about a set of objects 1-n, with corresponding additional data 1-n. Component 608 constructs a combination object using all or a subset of the set of objects 1-n. In one embodiment, component 608 proposes a combination of a subset of objects 1-n by combining standard or generic images available at application x for those objects and not any portions of actual image inputs captured at applications 1-n. Furthermore, the standard images of the component objects in any selected subset may be arranged in different orders or orientations to create different proposed combinations.

Component 610 determines a future time and a location at that time where the combination proposed by component 608 can be constructed. Component 610 also identifies the persons who would participate by bringing the objects of the subset to the future location.

Component 612 operates a trained RCNN on the combined object proposed by component 608. Component 612 operates in a manner substantially similar to component 320 in FIG. 3. In one embodiment, the region detection function of subcomponent 410 may be omitted because the combination proposed by component 608 is not from any actual image capture but has been constructed based on the descriptive or identifying information of objects 1-n or a subset thereof.

When component 612 determines that a combination proposed by component 608 is also an object of interest, application 602 outputs the combination as combination object of interest 614. Application 602 also outputs additional information 616. Additional information 616 includes, as a non-limiting example, the future time, future location, and person(s) who could make the combination possible at the future time and location.

Figure 7:
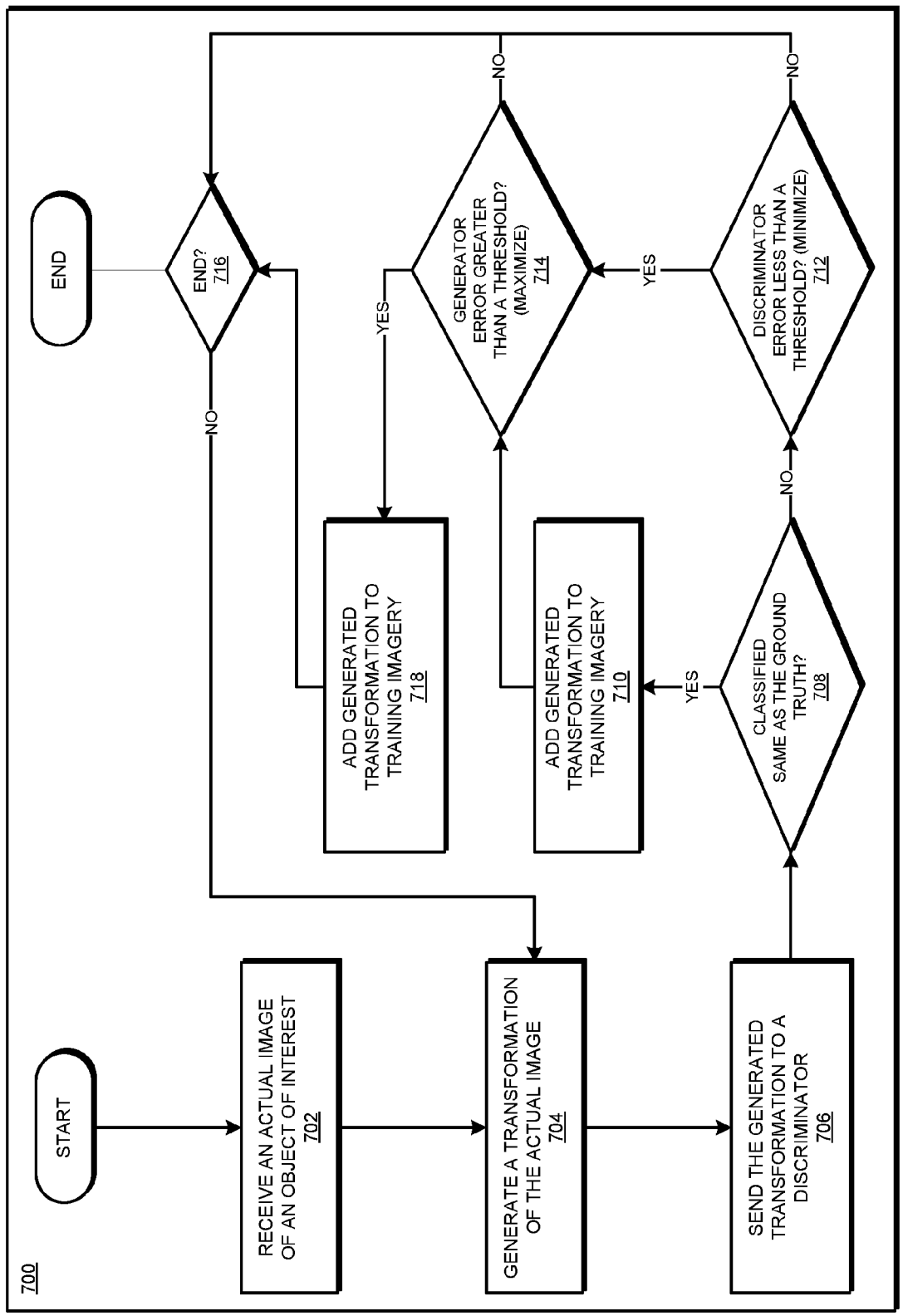
FIG. 7 depicts a flowchart of an example process for generating training imagery in accordance with an illustrative embodiment.

With reference to FIG. 7, this figure depicts a flowchart of an example process for generating training imagery in accordance with an illustrative embodiment. Process 700 can be implemented in application 502 in FIG. 5.

The application receives an actual image (ground truth) of an object of interest (block 702). The application generates a transformation of the actual image (block 704). For example, the application generates what could be an x-ray image of the object in the actual visual light image.

The application sends the generated transformed image to a discriminator component of the application (block 706). Using the discriminator, the application determines whether the generated transformed image can be classified the same as the ground truth (block 708). In other words, the application determines whether the generated transformed image and the ground truth are both of an object of the same classification. As some non-limiting examples, a class of an object can be defined according to a utility of the object (e.g., a cutting instrument), a classification used for other purposes (e.g., objects classified as firearms), a composition of the object (e.g., fertilizer type of mixture), a characteristic of the object (e.g., inflammable), a name or type of the object (e.g., "Acme" or dynamite), a purpose of the object (e.g., ammunition), and many other bases for classification.

If the application determines that the classification is the same ("Yes" path of block 708), the application adds the generated transformed image to the training imagery set (block 710). The application then proceeds to block 714.

If the application determines that the classification is not the same ("No" path of block 708), the application determines whether the discriminator error value is less than a threshold (block 712). If the application determines that the discriminator error value is less than a threshold ("Yes" path of block 712), the application proceeds to block 714. If the application determines that the discriminator error value is equal to or greater than the threshold ("No" path of block 712), the application determines whether to end the generation of transformed images (block 716). If the generation is not to end ("No" path of block 716), the application returns to block 704 to generate another transformation. If the generation is to end ("Yes" path of block 716), the application ends process 700 thereafter.

The application determines whether the generator error value is greater than a threshold for the generator (block 714). If the generator error value is greater than the threshold for the generator ("Yes" path of block 714), the application adds the generated transformed image to the training imagery set (block 718). The application then proceeds to block 716 and proceeds thereafter as described earlier. If the generator error value is not greater than the threshold for the generator ("No" path of block 714), the application proceeds to block 716 and proceeds thereafter as described earlier.

Figure 8:
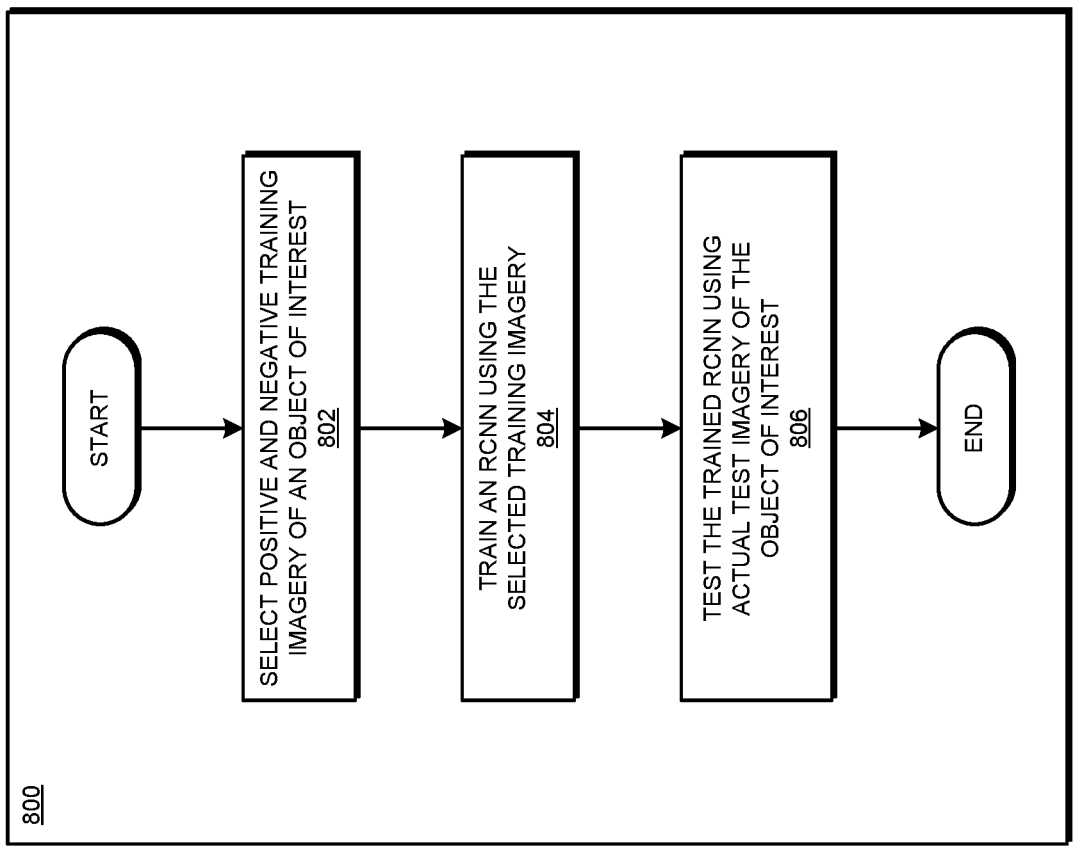
FIG. 8 depicts a flowchart of an example process for training an RCNN for object detection in accordance with an illustrative embodiment.

With reference to FIG. 8, this figure depicts a flowchart of an example process for training an RCNN for object detection in accordance with an illustrative embodiment. Process 800 can be implemented in application 302 in FIG. 3.

The application selects positive and negative training imagery of an object of interest (block 802). The application trains an RCNN using the selected training imagery (block 804). The application tests the trained RCNN using actual test imagery of the object of interest (block 806). The application ends process 800 thereafter.

Figure 9:
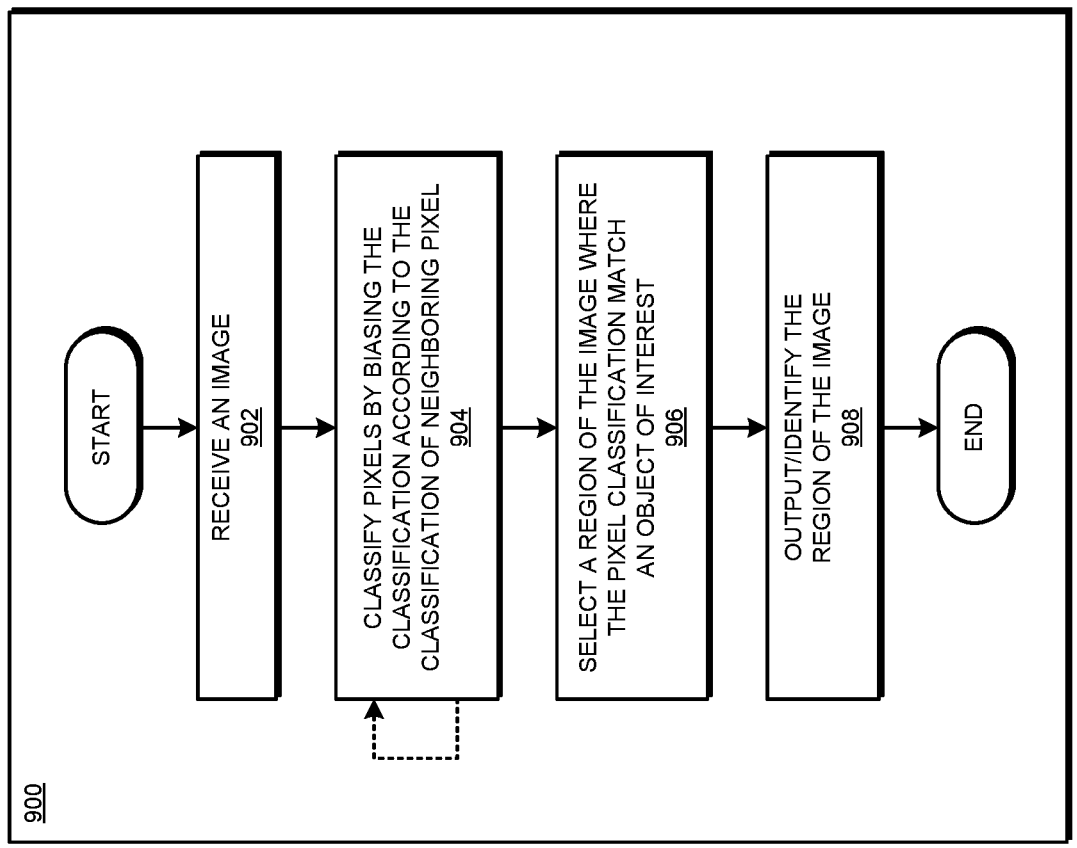
FIG. 9 depicts a flowchart of an example process for region selection in a given image in accordance with an illustrative embodiment.

With reference to FIG. 9, this figure depicts a flowchart of an example process for region selection in a given image in accordance with an illustrative embodiment. Process 900 can be implemented in application 402 in FIG. 4.

The application receives an image, such as of a scanned passenger bag from an x-ray scanner at an airport (block 902). The application classifies pixels or groups of pixels by biasing the classification according to the classification of a neighboring pixel or neighboring group of pixels (block 904). The application repeats block 904 as many times as needed to process the image received in block 902.

Based on the classification of pixels, the application selects a region of the image where the classification of the pixels matches a classification of an object of interest up to at least a threshold degree or amount of match (block 906). The application outputs or identifies the region selected in block 906 as a region within which an object of interest is likely to be found with an associated degree of likelihood (block 908). The application ends process 900 thereafter.

Figure 10:
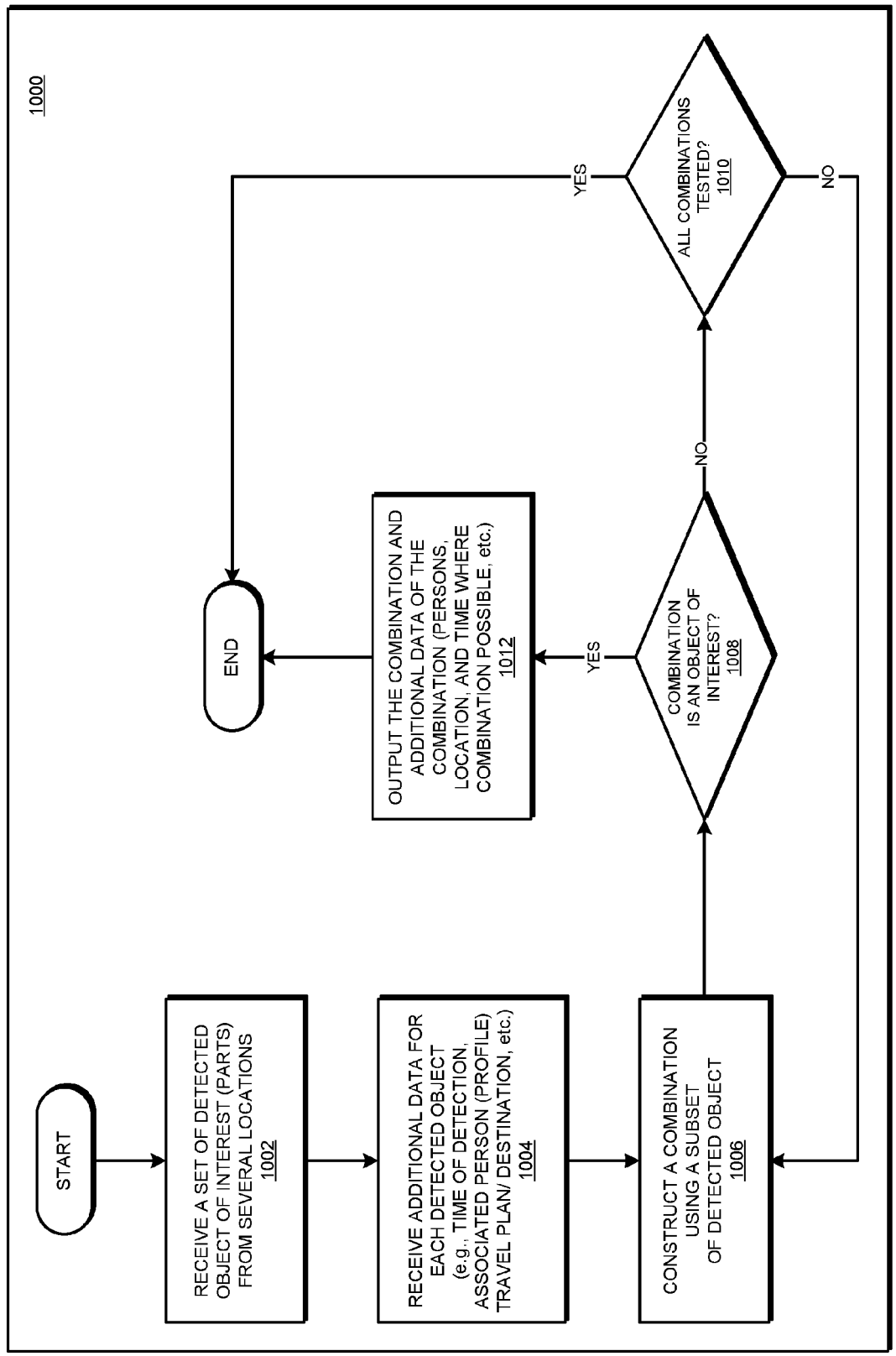
FIG. 10 depicts a flowchart of an example process for detecting a combination object of interest in accordance with an illustrative embodiment.

With reference to FIG. 10, this figure depicts a flowchart of an example process for detecting a combination object of interest in accordance with an illustrative embodiment. Process 1000 can be implemented in application 602 in FIG. 6.

The application receives a set of detected objects of interest (parts) from several locations (block 1002). The application receives additional data for each detected object, e.g., a time of the detection, an itinerary or travel plan of a person associated with the object, a profile of the person, and the like (block 1004).

The application constructs a combination using a subset of the detected objects (block 1006). The application determines whether the combination is itself an object of interest (block 1008).

If the combination is not an object of interest ("No" path of block 1008), the application determines whether all combinations have been tested (block 1010). If not all combinations have been tested ("No" path of block 1010), the application returns process 1000 to block 1006. If all combinations have been tested ("Yes" path of block 1010), the application ends process 1000 thereafter.

If the combination is an object of interest ("Yes" path of block 1008), the application outputs the combination and the additional data of the combination, e.g., persons who can make the combination possible, location and time when the combination will be possible in the future, and so on (block 1012). The application ends thereafter.

Thus, a computer implemented method, system or apparatus, and computer program product are provided in the illustrative embodiments for detection of objects in regions of images using convolutional neural networks and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving a transformed image, the transformed image comprising an other-than-visible light image that has been captured using a transformation device;
isolating a region of the transformed image, the region being less than an entirety of the transformed image;
training a convolutional Neural Network (CNN) using training imagery of the object of interest, wherein the training imagery comprises a generated transformed image of the object of interest, wherein the generated transformed image is computed from a generic visible light image of the object of interest;
detecting, by applying to the region the CNN which executes using a processor and a memory, and by processing only the region of the transformed image, an object of interest in the region; and
outputting, responsive to the detecting, an indication of a presence of the object of interest in the region.

2. The method of claim 1, further comprising:
detecting a second object of interest in a second transformed image, wherein the transformed image is captured by the transformation device at a first physical location, and the second transformed image is captured by a second transformation device at a second physical location;
combining a generic representation of the object of interest with a generic representation of the second object of interest;
generating an indication, responsive to determining that the combining forms a third object of interest.

3. The method of claim 2, further comprising:
identifying a first person associated with the object of interest;
determining a first travel plan of the first person;
identifying a second person associated with the second object of interest; and
determining a second travel plan of the first person;
identifying, using the first travel plan and the second travel plan, a future time and place where the first person can bring the object of interest and the second person can bring the second object of interest together to actually form the third object of interest.

4. The method of claim 1, further comprising:
computing the generated transformed image;
determining whether the generated transformed image can be classified under a classification of the object of interest within a threshold error value;
adding the generated transformed image to the training imagery responsive to the generated transformed image being classifiable under the classification of the object of interest within the threshold error value.

5. The method of claim 4, further comprising:
generating, as a part of the computing, the generated transformed image such that a variation between the generated transformed image and the transformed image is at least a second threshold error value.

6. The method of claim 1, further comprising:
generating a degree of confidence in the detecting of the object of interest in the region.

7. The method of claim 1, wherein the detecting occurs without any knowledge of any pre-determined feature of the object of interest, and by using a feed-forward network of weighted nodes in the CNN.

8. The method of claim 1, further comprising:
defining a neighborhood of a pixel in the transformed image; biasing a classification of the pixel according to a classification of a pixel in the neighborhood;
comparing the classification of a group of pixels in the transformed image with a classification of the object of interest; and
identifying, as a part of the isolating, the region wherein the region comprises the group of pixels.

9. The method of claim 8, wherein the neighborhood is defined by a pixel distance from the pixel in the transformed image, such that any pixel within the pixel distance from the pixel in the transformed image is within the neighborhood of the pixel in the transformed image.

10. The method of claim 8, wherein the classification of the object of interest is defined by a utility of the object of interest.

11. The method of claim 8, wherein the biasing is performed using a Modified Fuzzy C-Means algorithm.

12. The method of claim 1, further comprising:
generating a likelihood of a presence of the object of interest in the region.

13. The method of claim 1, wherein the transformed image is an x-ray image, and wherein the transformation device is an x-ray scanner.

14. A computer usable program product comprising one or more computer-readable storage devices, and program instructions stored on at least one of the one or more storage devices, the stored program instructions comprising:
program instructions to receive a transformed image, the transformed image comprising an other-than-visible light image that has been captured using a transformation device;
program instructions to isolate a region of the transformed image, the region being less than an entirety of the transformed image;
program instructions to train a convolutional Neural Network (CNN) using training imagery of the object of interest, wherein the training imagery comprises a generated transformed image of the object of interest, wherein the generated transformed image is computed from a generic visible light image of the object of interest;
program instructions to detect, by applying to the region the CNN which executes using a processor and a memory, and by processing only the region of the transformed image, an object of interest in the region; and
program instructions to output, responsive to the detecting, an indication of a presence of the object of interest in the region.

15. The computer usable program product of claim 14, further comprising:
program instructions to detect a second object of interest in a second transformed image, wherein the transformed image is captured by the transformation device at a first physical location, and the second transformed image is captured by a second transformation device at a second physical location;
program instructions to combine a generic representation of the object of interest with a generic representation of the second object of interest;
program instructions to generate an indication, responsive to determining that the combining forms a third object of interest.

16. The computer usable program product of claim 15, further comprising:
program instructions to identify a first person associated with the object of interest;
program instructions to determine a first travel plan of the first person;
program instructions to identify a second person associated with the second object of interest; and
program instructions to determine a second travel plan of the first person;
program instructions to identify, using the first travel plan and the second travel plan, a future time and place where the first person can bring the object of interest and the second person can bring the second object of interest together to actually form the third object of interest.

17. The computer usable program product of claim 14, wherein the computer usable code is stored in a computer readable storage device in a data processing system, and wherein the computer usable code is transferred over a network from a remote data processing system.

18. The computer usable program product of claim 14, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to receive a transformed image, the transformed image comprising an other-than-visible light image that has been captured using a transformation device;
program instructions to isolate a region of the transformed image, the region being less than an entirety of the transformed image;
program instructions to train a convolutional Neural Network (CNN) using training imagery of the object of interest, wherein the training imagery comprises a generated transformed image of the object of interest, wherein the generated transformed image is computed from a generic visible light image of the object of interest;
program instructions to detect, by applying to the region the CNN which executes using a processor from the one or more processors and a memory from the one or more memories, and by processing only the region of the transformed image, an object of interest in the region; and
program instructions to output, responsive to the detecting, an indication of a presence of the object of interest in the region.

* * * * *